Patented Jan. 9, 1951

2,537,006

UNITED STATES PATENT OFFICE 2,537,006

NITROSO DERIVATIVES OF SUBSTITUTED PTERIDINES AND METHOD OF PREPARING THE SAME

Donna B. Cosulich, Bound Brook, N. J., assignor to American Cyanamid Company, New York, N. Y., a corporation of Maine No Drawing. Application July 2, 1949,
Serial No. 102,947

12 Claims. (Cl. 260—251.5)

This invention relates to new pteridines. More particularly, it relates to $N^{10}$-nitrosopteroylglutamic acid and related compounds and methods of preparation thereof.

In the past nitrous acid has been reacted with a number of pteridines. Schöpf and Kottler (Ann. 539; 134 (1939)) dissolved xanthopterin (2-amino-4,6-dihydroxy pteridine) in 2 N sulfuric acid at 100° C. and added a concentrated solution of sodium nitrite. Carbon dioxide and nitrogen were evolved and the authors concluded that the pyrimidine ring had been ruptured. They further noted that if the reaction was carried out at 80° C. nitrogen was given off, but the amount of carbon dioxide was reduced to 54% of that in the first experiment. At 60° C. only part of the nitrogen was evolved as a gas and the yield of carbon dioxide was still considerable. A difficultly soluble reaction product of xanthopterin was obtained but was not identified. A rupture of the molecule also occurred when xanthopterin in concentrated sulfuric acid was treated with nitrosyl sulfuric acid; guanidine and oxalic acid were obtained, or, under milder conditions oxalylguanidine.

It is also known that leucopterin (2-amino-4,6,7-trihydroxy pteridine) when treated with an excess of nitrous acid in sulfuric acid solution, at first does not evolve nitrogen; however, when diluted with ice and water, a brisk evolution of gas takes place. The product obtained is desaminoleucopterin (2,4,6,7-tetrahydroxy pteridine). The above method of Weiland, Metzger, Schöpf and Bülow (Ann. 507; 245 (1933)) describes the quantative conversion of a 2-amino pteridine to a 2-hydroxy pteridine.

Still another reference, Wittle, O'Dell, Vandenbelt and Pfiffner (Journal of the American Chemical Society 69; 1780 (1947)) describes the degradation of pteroylglutamic acid in which they obtain 2-amino-4-hydroxy pteridine-6-carboxylic acid. The 2-amino group was converted readily to the 2-hydroxyl radical under the conditions of the Van Slyke nitrogen determination (Journal of Biological Chemistry 16; 121 (1913)) which consists of treating the substance in hydrochloric-acetic acid mixture with a large excess of nitrous acid, at a temperature ranging from room temperature to 30° C.

The reaction of excess nitrous acid on pteroic acid, p-[N-(2-amino-4-hydroxypyrimido[4,5-b]pyrazin-6-yl methyl)amino]benzoic acid, is described by Wolf et al. (Journal of American Chemical Society 69; 2758 (1947)). The product reportedly obtained in this reaction was p-[N-(2,4 - dihydroxypyrimido[4,5 - b]pyrazin - 6 - yl methyl)-nitrosamino]benzoic acid. In this reaction in addition to obtaining the nitroso derivative, the 2-amino radical of the pteroic acid was converted to the 2-hydroxy radical.

While working with folic acid concentrates from natural sources, Mitchell and Williams (Journal of the American Chemical Society 66; 272 (1944)) found that nitrous acid under the conditions of the Van Slyke determination, for 30 minutes, caused about 90% destruction of the biological activity of folic acid as measured in the microbiological assay on Streptococcus faecalis R.

A study of the prior art as shown above indicates that the action of nitrous acid on 2-amino-4-hydroxy pteridines leads to one of the following results: (1) destruction of the ring system; (2) desamination of the 2-amino group; (3) simultaneous desamination in the 2-position and nitrosation of the 10 nitrogen atom of pteroic acid; (4) biological inactivation of folic acid. The prior art further shows that the reactions described above were carried out using an excess of nitrous acid at temperatures ranging from room temperature to 100° C.

I have now found that pteroylglutamic acid and related compounds can be nitrosated under the conditions described hereinafter to produce the corresponding $N^{10}$-nitroso compounds without in any way interfering with substituents on the pteridine ring. The compounds prepared by the process of the present invention can be illustrated by the following general formula:

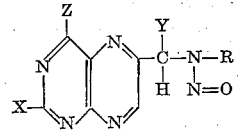

in which R is a monocyclic aryl radical, Y is hydrogen or a lower alkyl radical, Z is an —OH, —NH₂,—NHR' and —NR'R'' radical and X is a —NH₂, —NHR' and —NR'R'' radical, wherein R' and R'' are alkyl radicals or radicals forming a portion of a saturated heterocyclic ring.

It has also been found that the nitroso derivative, $N^{10}$-nitroso pteroylglutamic acid, retains its physiological activity in the nutrition of Streptococcus faecalis R. and chicks, and is of substantially the same biological activity as pteroylglutamic acid.

The intermediates used in the reaction of the present invention can be prepared by reacting a 4,5-diaminopyrimidine, a halogeno aliphatic aldehyde or ketone such as dihalopropionaldehyde, butyl chloral or a trihalo acetone and a primary aromatic amine. The primary aromatic amines can be compounds such as para-aminobenzoic acid and amides thereof, particularly the amino acid amides such as para-aminobenzoylglutamic acid and polypeptides thereof such as para-aminobenzoylglutamylglutamic acid, para-aminobenzoyldiglutamylglutamic acid and others having a plurality of peptide linkages made up of one or more of the various amino acids such as para-aminobenzoylserylglutamic acid. Compounds prepared with these intermediates are the preferred products of the present invention. Of course, amides of para-aminobenzoic acid and other amino acids such as glycine, aspartic acid, leucine, serine, sarcosine, phenylalanine, alanine, isovaline, cystine and the like are also useful in preparing intermediates of the present invention.

The reaction of the present invention will take place over a wide range of acidity. I prefer to use a mineral acid such as hydrochloric or sulfuric acid at such a concentration that the intermediate will be in solution at about 0° C. The reaction is carried out by adding to the acidic solution of the intermediate an equivalent of nitrous acid usually in the form of the alkali metal, alkaline earth metal or ammonium salt. These salts in the presence of an acid break down and liberate the free nitrous acid which is the reactant.

The reaction is preferably carried out at a temperature range of from −10° to +10° C. and preferably of from about −5° to +5° C.

The reaction is usually completed in a matter of minutes and the end of the reaction may be determined by a test with starch-iodide paper or paste in a manner familiar to those skilled in the art. In general, the $N^{10}$-nitroso derivative is less soluble than the starting material and precipitates directly from the cold solution.

Some of the compounds of the present invention such as $N^{10}$-nitroso pteroylglutamic acid. are valuable in the treatment of certain diseases of the circulatory system and in nutrition. Others are valuable because of their antagonistic action to folic acid.

The process and representative compounds of the invention will now be described in detail in the following examples. All parts are by weight unless otherwise indicated.

*Example 1*

A solution of 5.069 parts of pteroylglutamic acid (about 90% by chemical assay and containing 0.77% para-aminobenzoylglutamic acid) in 2 N hydrochloric acid is cooled to −5° to +5° C. and treated with 107.8 parts by volume of 0.1 N sodium nitrite solution, to an external starch-iodide paste end-point. The solution is allowed to stand a short time at 0° C. or below and the precipitate of $N^{10}$-nitrosopteroylglutamic acid which forms is filtered off and dried. It gives a strong Liebermann nitroso test. The product is equivalent to pteroylglutamic acid in the growth of S. faecalis R. and in the growth of higher animals such as the chick.

*Example 2*

A solution of 5.293 parts of pteroylglutamic acid in 2000 parts by volume of 2.5 N hydrochloric acid is cooled below 5° C. and treated with 114.8 parts by volume of 0.1 N sodium nitrite. The $N^{10}$-nitrosopteroylglutamic acid precipitates on cooling 40 minutes at −2° to 0° C.

*Example 3*

Another reaction was carried out as in Example 1 except that 6 N hydrochloric acid is used instead of 2 N. The weight of sample is 5.999 parts and requires 125.6 parts by volume of 0.1 N sodium nitrite. The indicated purity of the pteroylglutamic acid is thus 92.4%.

*Example 4*

A solution of 4.41 parts of pteroylglutamic acid dissolved in 58.5 parts of concentrated hydrochloric acid is cooled below 5° C. by adding ice internally as well as by external cooling. Below 5° C., 0.7 part of sodium nitrite in 10 parts of water is added gradually. The white solid, which starts precipitating during the addition of the nitrite, is filtered off after cooling for a short while. When dry it weighs 3.2 parts. It is purified by dissolving 1 part in 25 parts by volume of 5 N sodium hydroxide solution, which is clarified with activated charcoal, and on standing the sodium salt crystallizes out. It is collected, dissolved in water and precipitated with acid, filtered, washed, and dried at 100° C. for two hours at 2 mm. This product gives a microchemical analysis for carbon, hydrogen, and nitrogen, which checks very closely with the theoretical values for $N^{10}$-nitrosopteroylglutamic acid.

*Example 5*

A solution of 1.0125 parts tetrasodium pteroyltriglutamic acid at 0°–5° C. is treated with 10.59 parts by volume of 0.1 N sodium nitrite. On cooling a precipitate separates which is $N^{10}$-nitrosopteroyltriglutamic acid.

*Example 6*

A solution of 4.331 parts of 91% pteroyl-alpha-glutamylglutamic acid in concentrated hydrochloric acid at 0°–5° C. is treated with 73.5 parts by volume of 0.1 N sodium nitrite. The $N^{10}$-nitrosopteroylglutamylglutamic acid is formed.

*Example 7*

A solution of 5.026 parts of 84.9% 4-(2,4-diamino-6-pteridylmethyl) aminobenzoylglutamic acid in concentrated hydrochloric acid is treated with 96.7 parts by volume of 0.1 N sodium nitrite. On cooling, $N^{10}$-nitroso-4-(2,4-diamino-6-pteridylmethyl) aminobenzoyl-glutamic acid precipitates out.

*Example 8*

A solution of 2.026 parts of 2-dimethylamino-4-aminopteroylglutamic acid in about 27 parts of dilute hydrochloric acid is treated at 0°–5° C. with one mole of sodium nitrite. The $N^{10}$-nitroso -2- dimethylamino -4- aminopteroylglutamic acid is formed.

*Example 9*

To a solution of 2.046 parts of 2-dimethylaminopteroyl-glutamic acid in about 27 parts of dilute hydrochloric acid at 0°–5° C. is added one mole of sodium nitrite. The $N^{10}$-nitroso-2-dimethylaminopteroylglutamic acid precipitates.

*Example 10*

A solution of 2.059 parts of 4-(1-piperidyl)pteroyl-glutamic acid in 27 parts dilute hydrochloric acid at 0°–5° C. is treated with one mole of sodium nitrite. The $N^{10}$-nitroso-4-(1-piperidyl) pteroylglutamic acid precipitates.

*Example 11*

A A solution of 5.017 parts of 9-methylpteroylglutamic acid (84.9%) in about 6 parts of concentrated hydrochloric acid with ice added to cool to 0° C. is treated with 94 parts by volume of 0.1 N sodium nitrite. The 9-methyl-$N^{10}$-nitrosopteroylglutamic acid is formed.

I claim:
1. Compounds having the formula:

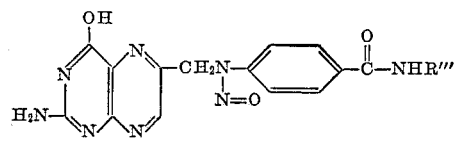

in which the group NHR''' is the radical of an amino acid.

2. N-(4-[2-amino-4-hydroxypyrimido[4,5-b]pyrazyl-6-methyl-N-nitrosoamino]benzoyl) glutamic acid.

3. N-(4-[2-amino-4-hydroxypyrimido[4,5-b]pyrazyl-6-methyl-N-nitrosoamino]benzoyl) glutamylglutamylglutamic acid.

4. N-(4[2,4-diaminopyrimido[4,5-b]pyrazyl-6-methyl-N-nitrosoamino]benzoyl) glutamic acid.

5. A method which comprises reacting together a compound having the formula:

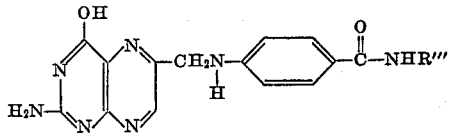

in which the group NHR''' is the radical of an amino acid, and nitrous acid in a substantially aqueous solvent at a temperature within the range of —10° C. to +10° C. and after reaction thereof recovering a compound having the formula:

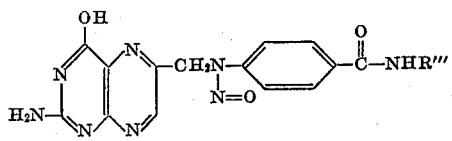

in which the group NHR''' is as defined.

6. A method which comprises mixing together in a substantially aqueous solvent at a temperature within the range of about —10° C. to about +10° C. N-(4-[2-amino-4-hydroxypyrimido[4,5-b]-pyrazyl-6-methylamino]benzoyl) glutamic acid and nitrous acid and after reaction thereof recovering the N-(4-[12-amino-4-hydroxypyrimido[4,5-b]-pyrazyl-6-methyl-N-nitrosoamino]benzoyl) glutamic acid.

7. A method which comprises mixing together in a substantially aqueous solvent at a temperature within the range of about —10° C. to about +10° C. N-(4-[2-amino-4-hydroxypyrimido[4,5-b]-pyrazyl-6-methylamino]benzoyl) glutamyl-glutamylglutamic acid and nitrous acid and after reaction thereof recovering N-(4-[2-amino-4-hydroxy-pyrimido[4,5-b]pyrazyl-6-methyl-N-nitrosoamino]benzoyl) glutamylglutamylglutamic acid.

8. A method which comprises mixing together in a substantially aqueous solvent at a temperature within the range of about —10° C. to about +10° C. N-(4-[2,4-diaminopyrimido[4.5-b]pyrazyl-6-methylamino]benzoyl)glutamic acid and nitrous acid and after reaction thereof recovering N-(4-[2,4-diaminopyrimido[4,5-b]pyrazyl-6-methyl-N-nitrosoamino]benzoyl) glutamic acid.

9. Compounds of the group consisting of those having the following formula:

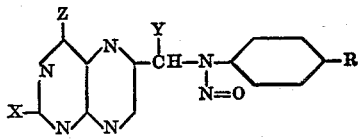

in which R is a member of the group consisting of a carboxyl radical and amides, salts and esters thereof, Y is a member of the group consisting of hydrogen and lower alkyl radicals, Z is a member of the group consisting of hydroxyl, amino, lower monoalkylamino, lower dialkylamino and reduced heterocyclic radicals containing nitrogen and X is a member of the group consisting of amino, lower monoalkylamino and lower dialkylamino radicals.

10. Compounds of the group consisting of those having the formula:

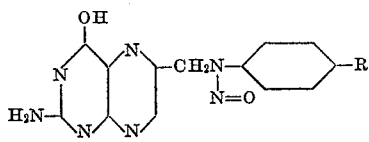

in which R is a member of the group consisting of a carboxyl radical and amides, salts and esters thereof.

11. A method which comprises reacting together a compound having the formula:

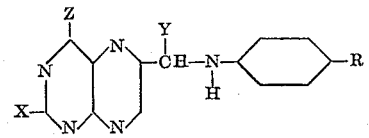

in which R is a member of the group consisting of a carboxyl radical and amides, salts and esters thereof, Y is a member of the group consisting of hydrogen and lower alkyl radicals, Z is a member of the group consisting of hydroxyl, amino, lower monoalkylamino, lower dialkylamino and reduced heterocyclic radicals containing nitrogen and X is a member of the group consisting of amino, lower monoalkylamino and lower dialkylamino radicals, and nitrous acid in a substantially aqueous solvent at a temperature within the range of —10° C. to +10° C. and after reaction thereof recovering a compound having the formula:

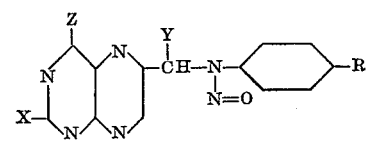

in which R, X, Y and Z are as defined.

12. A method which comprises reacting together a compound having the formula:

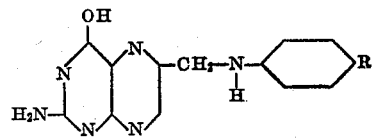

in which R is a member of the group consisting of a carboxyl radical and amides, salts and esters thereof, and nitrous acid in a substantially aqueous solvent at a temperature within the range of —10° C. to +10° C. and after reaction thereof, recovering a compound having the formula:

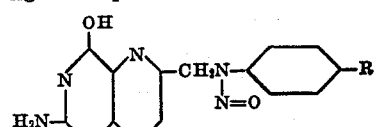

in which R is as defined.

DONNA B. COSULICH.

No references cited.